May 29, 1962     H. G. SCHURECHT     3,037,140
ELECTRICALLY SEMI-CONDUCTING CERAMIC BODY
Filed Aug. 21, 1958
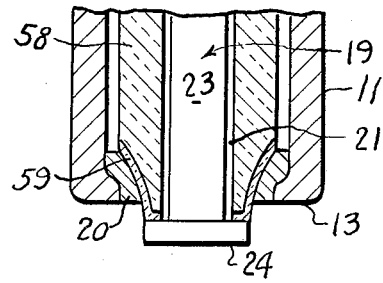
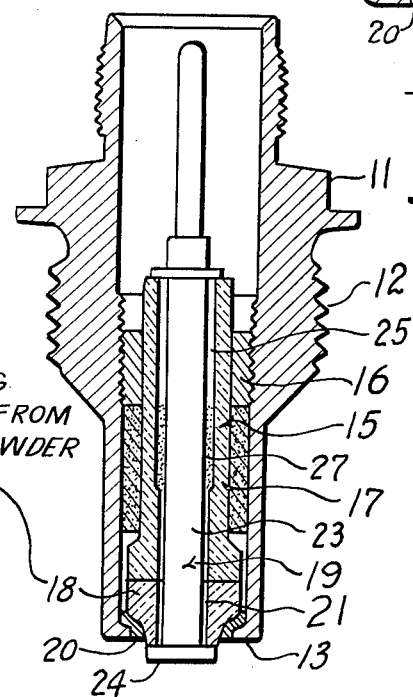
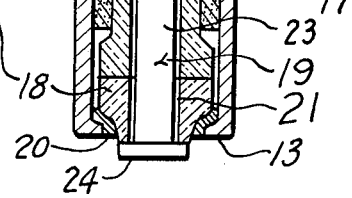
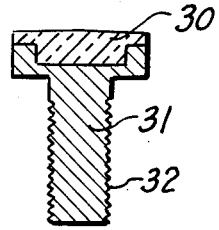
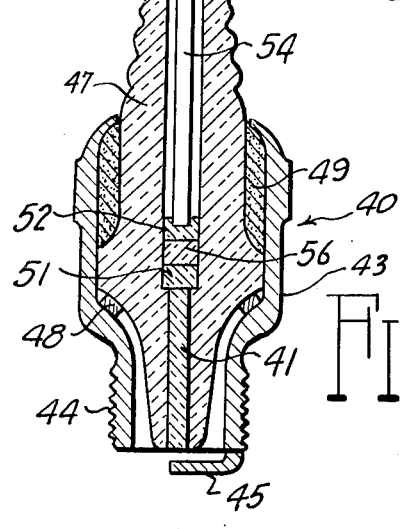
INVENTOR.
Harry G. Schurecht
BY Owen & Owen United States Patent Office 3,037,140
Patented May 29, 1962

3,037,140
ELECTRICALLY SEMI-CONDUCTING
CERAMIC BODY
Harry G. Schurecht, Detroit, Mich., assignor to Champion Spark Plug Company, Toledo, Ohio, a corporation of Delaware
Filed Aug. 21, 1958, Ser. No. 756,376
8 Claims. (Cl. 313—131)

This invention relates to an electrically semi-conducting ceramic body, and, more particularly, to such a body produced by firing in an oxidizing atmosphere a mixture consisting essentially of copper-metal powder and alumina in specified proportions.

A recent development in the field of spark plugs and jet engine igniters contemplates a high energy spark discharge over the surface of an electrically semi-conducting ceramic nose of a spark plug or jet engine igniter. Although many advantages are achieved from using this type of discharge to fire reciprocating engines and jet engines, so far as is known, no completely satisfactory electrically semi-conducting material has heretofore been available for use in the manufacture of such spark plugs or jet engine igniters. To be satisfactory for this purpose an electrically semi-conducting material must be capable of production on a large scale with closely reproducible combinations of surface resistivity and cubic resistivity within the requisite range, and bodies when produced must be capable of withstanding a certain amount of mechanical shock, heat shock incident to the starting and stopping of internal combustion engines, and must be able to withstand the erosive atmosphere and temperature conditions prevailing in the firing chamber of an internal combustion engine for substantial periods of time. In addition, such material must be vitreous, or have a water absorption not greater than about 0.5 percent, so that liquid fuel is not absorbed and carbonized to render them electrically conducting. So far as is known, no previously tried electrically semi-conducting material has been satisfactory for such use, for the reason that any material having the requisite resistivity characteristics has been unable to withstand the temperature and atmosphere conditions in the firing chamber of an internal combustion engine for more than a few hours. The most common fault which has developed in the firing chamber has been cracking of the electrically semi-conducting material.

The present invention is based upon the discovery that an electrically semi-conducting material can be produced by firing an admixture of copper-metal powder and alumina in certain proportions, in an oxidizing atmosphere, and to a temperature within a certain relatively narrow range. The material so produced when used as the nose portion of a high energy discharge surface gap spark plug has been found capable of withstanding atmosphere and temperature conditions up to about 1600° F. in the firing zone of an internal combustion engine for as long as 100 hours without any kind of failure.

It is, therefore, an object of the invention to produce an electrically semi-conducting ceramic body suitable for use as the nose portion of a spark plug or a jet engine igniter, and for other uses, such as contact buttons of distributors where the voltage and current are high enough to cause early failure in conventional equipment.

It is a further object of the invention to provide an improved high energy spark plug, jet engine igniter, or the like comprising an insulating portion and an electrically semi-conducting nose portion fired to vitrification.

It is another object of the invention to provide an improved contact button for use, for example, in the distributor of an ignition system for an internal combustion engine, and incorporating an electrically semi-conducting ceramic body.

It is still a further object of the invention to provide a spark plug wherein an electrically semi-conducting ceramic body fired to vitrification serves as a center electrode.

Other objects and advantages of the invention will be apparent from the description which follows, reference being had to the accompanying drawings, in which—

FIG. 1 is a vertical sectional view showing a jet engine igniter of the high energy discharge surface gap type having an electrically semi-conducting nose portion;

FIG. 2 is a central cross-sectional view of the distributor contact for an ignition system distributing high voltage, and composed, in part, of an electrically semi-conducting ceramic material of the invention;

FIG. 3 is a vertical sectional view showing a spark plug wherein the central electrode is composed of an electrically semi-conducting ceramic material; and FIG. 4 is an enlarged fragmentary view of a modified igniter similar to that of FIG. 1.

According to the invention, an electrically semi-conducting vitreous ceramic body is provided. Such vitreous ceramic body is produced by firing in an oxidizing atmosphere from about Orton Cone 10 to about Orton Cone 18, and to a temperature from about 2350° F. to about 2705° F. an admixture consisting essentially of from about 5 percent to about 80 percent of copper-metal powder and from about 95 percent to about 20 percent alumina. If desired, as much as about 10 percent of whiting, talc, bentonite or other conventional fluxing agent can without detriment be included in the alumina-copper-metal powder admixture. Most desirably the firing is to about Orton Cone 13 (about 2450° F.).

The terms "percent" and "parts" are used herein, and in the appended claims, to refer to percent and parts by weight unless otherwise indicated.

Referring now more particularly to the drawings, and especially to FIG. 1, a typical high energy discharge type jet engine igniter embodying an electrically semi-conducting nose portion of the invention comprises a shell 11 threaded as at 12 for engagement with the wall of the combustion chamber of a jet engine, and provided, in the construction shown, with an inwardly extending lower flange 13. An insulator 15 is seated and fixed in the shell by a compressed body of holding powder over which is disposed a metallic sleeve 16 threaded into the shell 11. The insulator 15 is composed of an electrically insulating upper portion 17 and an electrically semi-conducting nose portion 18, and supports a central electrode 19. In assembly the insulator 15 is disposed so that the nose portion 18 thereof is seated against a ground electrode 20, which is in turn forced against the flange 13 of the shell. An air gap 21 of a few thousandths of an inch separates the electrode 19 from the lower portion of the insulating portion 17 and from the nose portion 18.

The central electrode 19 may be of any suitable construction, and in the form shown is composed of a stem part 23 and an integral flange 24. The stem part 23 is received in an enlarged central hole 25 of the insulator 15, while the flange 24 bears against a flat surface of the nose portion 18 of the insulator 15, thus assuring satisfactory electrical contact. The stem part 23 of the electrode 19 is sealed in the central hole 25 in any known manner as by a suitable sealing material 27.

The electrically semi-conducting nose portion 18 of the insulator 15 can be bonded to the insulating upper portion 17 in any suitable manner. It should be observed, however, that the bond between these two parts must be capable of withstanding the temperatures normally encountered in a jet engine or in a reciprocating engine, depending upon the intended use. A suitable method for accomplishing such bonding is described in detail in Example 1 hereof.

In operation, a relatively low voltage electric charge is applied to the central electrode 19, and flows therethrough and into the electrically semi-conducting nose portion 18. The charge then flows in part through, and in part along the surface of, the nose portion 18, through the shell electrode 20 and the shell 11 to ground to complete the ignition circuit. The part of the charge which flows along the surface of the nose portion 18 causes ignition, while that part which flows interiorly thereof is wasted and merely generates heat. Therefore, it is apparent that the ideal electrically semi-conducting ceramic material for use in the FIG. 1 structure should combine relatively high surface conductivity with relatively low cubic conductivity. However, reliable tests for evaluating electrically semi-conducting materials by comparing these two conductivities have not as yet been proven, but it has been demonstrated that vitreous ceramic materials produced by firing admixtures of copper-metal powder and alumina in the proportions set forth and under the conditions disclosed herein are highly satisfactory for this use.

Referring now to FIG. 2, a contact button comprising a body 30 composed of an electrically semi-conducting ceramic material of the invention suitably attached to a metal support 31, which also acts as a conductor, is shown. The support 31 is threaded as indicated at 32 so that it can be turned into the distributor of an internal combustion engine. The body 30 can be produced merely by pressing, in suitably shaped dies, an admixture of copper-metal powder and alumina, in the above-identified proportions, to form a pressed body which can be handled without losing its shape. This pressed body is then fired to a temperature as indicated above, about cone 13, to vitrify the copper-metal powder-alumina admixture, and attached, as by silver soldering, to the metal support.

The semi-conducting material of the invention may also be used as an integral electrode in a spark plug as indicated in FIG. 3. The plug, designated generally by the numeral 40, is provided with a center electrode assembly having a firing tip 41 composed of an electrically semi-conducting material. The spark plug 40 comprises a shell 43 threaded as at 44 for engagement with the cylinder head of an internal combustion engine, and carrying a shell electrode 45. An insulator 47 is seated and fixed in the shell by a metallic gasket 48 and suitable sealing material 49, and supports the center electrode assembly with the firing tip 41 in the usual cooperating relation with the shell electrode.

The center electrode assembly, above the firing tip, comprises, in the structure shown, a lower electrically-conducting holding powder layer 51 contacting the firing tip, an upper, electrically-conducting holding powder layer 52 contacting an upper electrode 54, and an electrically-conducting sealing material 56 between the layers 51 and 52, and contacting each. The upper electrode 54 is suitably attached to a contact button 57. The holding powder layers 51 and 52 and the sealing material 56 may be of composition as set forth in Example 4, below.

The firing tip 41 may be produced merely by pressing a pellet of the required shape from a copper metal powder and alumina admixture in the proportions above set forth and firing the pellet in an oxidizing atmosphere to about Orton Cone 13 (about 2450° F.). The fired pellet can then be sealed in the core of a previously fired insulating portion, for instance in the manner set forth in Example 4. The rest of the spark plug is assembled in a conventional manner. It has been found in actual engine tests that electrically semi-conducting firing tips 41 are less subject to erosion than are conventional metal electrodes.

Referring now to FIG. 4, a fragment, specifically the nose or firing end, of an igniter which is preferred in certain respects over the igniter of FIG. 1, and which is a modification of such igniter, is shown. Like the igniter of FIG. 1, that of FIG. 4 comprises a shell 11 provided with an inwardly extending lower flange 13 against which a ground electrode 20 is forced, and a central electrode 19 having a stem part 23 and an integral flange 24. The stem part 23 of the electrode 19 is separated by an air gap 21 from the central bore of an insulator 58 which is significantly different from the insulator 17 of the FIG. 1 igniter. The insulator 58 has generally the shape of the combined structure of the FIG. 1 igniter composed of the insulator 17 and the structurally integral electrically semi-conducting nose portion 18, and is provided with an electrically semi-conducting surface coating 59, which coating comprises a body produced from copper metal powder and alumina. An insulator coated with such an electrically semi-conducting engobe can be produced as described in Example 5, below.

The following examples are presented further to illustrate and disclose the invention, but are in no way to be construed as limitations thereon.

EXAMPLE 1

An electrically semi-conducting ceramic body having the shape of the nose portion 18 of FIG. 1, was produced according to the following procedure:

A mixture consisting essentially of copper-metal powder and alumina was prepared by blending 30 grams of minus 100 mesh, U.S. Sieve Series, copper-metal powder, 66.5 grams of minus 100 mesh alumina, 2.0 grams of talc, 1.5 grams of bentonite, 1.5 grams of whiting, and 10 grams of paraffin wax dissolved in carbon tetrachloride. The ingredients were thoroughly mixed, and the carbon tetrachloride volatilized, leaving the wax uniformly dispersed throughout the composition. A body having generally the shape of the nose portion 18 in the attached drawings was then pressed from the resulting composition using a pressure of about 10,000 pounds per square inch, and was fired to Orton Cone 16 (about 2642° F.).

The electrically semi-conducting ceramic body produced as described above was then bonded to an electric insulator having generally the shape of the upper portion 17, shown in FIG. 1 of the drawings. Such bonding was accomplished by preparing a uniform slip from 38 parts of water, 5 parts of dextrine, 40 parts of alumina, and 60 parts of glass. The glass used consisted essentially of 40.93 percent of silica, 35.15 percent of PbO, 5.18 percent of $Al_2O_3$, 3.03 percent of alkali-metal oxides, 14.63 percent of $B_2O_3$, traces of $TiO_2$, $Fe_2O_3$, CaO, and MgO, and had an igition loss of approximately 0.04 percent. The screen analysis of the glass was as follows:

| Screen Size U.S. Sieve Series | 80 | 100 | 150 | 200 | 250 | 325 | through 325 |
|---|---|---|---|---|---|---|---|
| Percent of Glass Retained | 0.2 | 1.2 | 6.8 | 14.4 | 19.4 | 20.5 | 79.5 |

The alumina used was relatively pure, and was ground so that substantially all of it passed a 325 mesh sieve, U.S. Sieve Series.

The flat mating surfaces of the electrically semi-conducting body and of the electric insulator were then moistened, and coated with the slip produced as described in the preceding paragraph. The coated surfaces were then joined, and held together until the dextrine in the slurry formed a temporary bond. The resulting temporarily bonded body was then fired to about 1800° F.

Such bodies, when assembled as shown in FIG. 1 to form igniter plugs, have been found, as a result of extensive test work, to be fully satisfactory in engine performance at operating temperatures up to about 1600° F. The nose portion of such igniters, which is the only part of the insulator exposed to the combustion chamber temperature and atmosphere, is not appreciably affected thereby, even after extended operation.

When the procedure described in the first paragraph of this example was repeated, except that the bodies having generally the shape of the nose portion 18 in FIG. 1 of the attached drawings was fired to Orton Cone 13 (about 2450° F.) the fired bodies which were produced were found to be more resistant to cracking upon reheating, when embedded in graphite, than were such bodies produced by firing to Orton Cone 16. Since heating of fired bodies embedded in graphite simulates engine conditions, the bodies fired to the lower temperature of Cone 13 are preferred. Similarly, satisfactory bodies can be produced by even lower firing, for example as low as about Orton Cone 10 (approximately 2350° F.).

EXAMPLE 2

Various other mixtures consisting essentially of copper-metal powder and alumina have been produced and formed into ceramic bodies in the manner hereinbefore described. As a result of such additional experimental work it has been ascertained that such mixtures wherein the copper-metal content varies from about 5 percent to about 65 percent, and the alumina content, therefore, varies from about 95 percent to about 35 percent can be used to produce electrically semi-conducting bodies suitable for spark plug and other uses as described herein. It has also been ascertained that the preferred range of copper-metal powder content is from about 20 percent to about 50 percent, with the alumina content, therefore, ranging from about 80 percent to about 50 percent.

Examples of additional mixtures consisting essentially of copper-metal powder and alumina that have been used to produce such electrically semi-conducting ceramic bodies are presented in Table I below:

*Table I*

| Grams of Copper-Metal Powder | Grams of Alumina | Grams of Whiting | Grams of Talc | Grams of Bentonite | Cone | Firing Temperature, °F. | Electrical Resistance [1] |
|---|---|---|---|---|---|---|---|
| 80.0 | 20.0 | | | | 16 | 2,642 | 0.5 megs. [2]. |
| 60.0 | 40.0 | | | | 16 | 2,642 | 0.5 megs. [2]. |
| 50.0 | 46.5 | 1.5 | 2.0 | 1.5 | 16 | 2,642 | 400,000 ohms. |
| 40.0 | 60.0 | | | | 16 | 2,562 | 1,720 ohms [3]. |
| 40.0 | 56.5 | 1.5 | 2.0 | 1.5 | 16 | 2,642 | 25,000 ohms. |
| 20.0 | 80.0 | | | | 16 | 2,642 | 2 megs. [2]. |
| 20.0 | 76.5 | 1.5 | 2.0 | 1.5 | 16 | 2,642 | 600,000 ohms. |
| 10.0 | 86.5 | 1.5 | 2.0 | 1.5 | 16 | 2,642 | 50 megs. [2]. |

[1] Measured with a 500 volt megger on ½ inch bushings having a ⅛ inch bore.
[2] Megohms.
[3] Measured with 4.5 volt bridge.

The variations in electrical resistance of ceramic materials produced from copper-metal powder and alumina in varying proportions, as shown in Table I, above, are believed to indicate that chemical reaction occurs during firing to produce a compound which is electrically conducting, and which is responsible for conductivity characteristics of bodies according to the invention. On the basis of X-ray diffraction analysis it is believed that this compound is copper-alumina spinel ($CuAl_2O_4$). It will be noted that this compound would be formed from an admixture containing 38.4 percent of copper and 61.6 percent of alumina, and that the composition having the lowest resistance presented in Table I was produced from 40 percent of copper-metal powder and 56.5 percent of alumina. Although the invention is not limited to or by this theoretical suggestion, it appears that the copper-alumina spinel is formed, and is the principal electrically conducting constituent of ceramic bodies according to the invention, as either raising or lowering the copper content from the spinel composition seems to reduce conductivity. Preferred bodies according to the invention are therefore produced from admixtures containing from about 20 percent to about 50 percent of copper metal powder and from about 80 percent to about 50 percent of alumina. Most desirably such admixtures contain from about 35 percent to about 45 percent of copper-metal powder, and from about 65 percent to about 55 percent of alumina. Bodies produced by firing such an admixture containing less than about 50 percent of copper-metal powder are preferred because electrical characteristics thereof are more accurately reproducible than when the admixtures contain a higher proportion of copper and also because alumina is the less expensive of the two main ingredients.

EXAMPLE 3

An electrically semi-conducting ceramic body having the shape of the button 30 of FIG. 1 was produced according to the following procedure:

A mixture consisting essentially of copper-metal powder and alumina was prepared by blending 33.8 grams of minus 100 mesh copper-metal powder, 62.7 grams of minus 325 mesh, U.S. Sieve Series, alumina, 1.5 grams of talc, 2.0 grams of bentonite, 1.5 grams of whiting, and 10 percent of paraffin wax, based on the weight of dry ingredients, dissolved in carbon tetrachloride. The ingredients were thoroughly mixed, and the carbon tetrachloride volatilized, leaving the wax uniformly dispersed throughout the composition. A body having generally the shape of the button 30 in the attached drawings was then pressed from the resulting composition in a suitable die, using a pressure of 10,000 pounds per square inch, and was fired to Orton Cone 16 (about 2642° F.). The button 30 was then silver soldered to the support 31.

Contact buttons produced as described above have been tested in actual operation in high voltage internal combustion engine ignition systems, and have been found to have many times the life of previously known contact buttons.

EXAMPLE 4

An electrically semi-conducting spark plug firing tip was produced and assembled in an insulator according to the following procedure:

An admixture of 30 grams of copper-metal powder, 66.5 grams of alumina, 1.5 grams of whiting, 2.0 grams of talc, 1.5 grams of bentonite, and 10 grams of paraffin wax dissolved in carbon tetrachloride was prepared and thoroughly mixed. The carbon tetrachloride was then volatilized, leaving the wax uniformly dispersed throughout the composition, and a body having generally the shape of the firing tip 41 (FIG. 3) was pressed therefrom under a pressure of approximately 75,000 pounds per square inch. The pressed body or pellet was then fired in an oxidizing atmosphere to Orton Cone 16 (about 2642° F.). A composition consisting of 60 grams of finely ground glass, 40 grams of alumina, 10 grams of aluminum, and 5 grams of dextrine was then pasted to about the consistency of thick cream with water, and applied to the electrode pellet, which was then inserted in an insulating portion as shown in FIG. 3 of the attached drawings.

Electrically conducting holding powder pellets were then pressed under about 400 pounds total pressure from a composition consisting of about 80 grams of aluminum-metal powder, 5 grams of chromium-metal powder, 5 grams of iron-metal powder, 5 grams of glass, and 5 grams of Tennessee ball clay. A number of these pellets were placed in the central bore of the insulator, in contact with the firing tip 41, and upset to form the conducting holding powder layer 51 using a pressure of about 200 pounds. A glass seal consisting of a uniform admixture of about 77.5 grams of glass, 17.5 grams of aluminum-metal powder, and about 5 grams of Tennessee ball clay was then inserted in the bore of the insulator in contact with the holding powder layer 51, and tamped in place under a pressure of about 400 pounds to form the electrically-conducting sealing material 56. Additional pellets of the conducting holding powder material were then placed in the central bore of the insulator in contact with the sealing material 56, and upset under a pressure of about 200 pounds to form the second electrically-conducting holding powder layer 52. The upper electrode 54 was then pressed into the holding powder layer 52 and the resulting assembly fired, with the electrode tip 41 at least partially in contact with powdered graphite, to about 1400° F.

The remainder of the spark plug shown in FIG. 3 was then assembled in a conventional manner.

If, for purposes of comparison, but not in accordance with the invention, titania, magnesia, zirconia, stannic oxide, ceric oxide, or zinc oxide is substituted for alumina, the resulting body, after firing, is found to be electrically insulating rather than electrically semi-conducting, and, therefore, useless as a substitute for electrically semi-conducting ceramic bodies produced from mixtures consisting essentially of copper-metal powder and alumina in accordance with the invention.

EXAMPLE 5

An igniter having a nose portion as shown in FIG. 4 can be produced according to the following procedure:

A uniform slip consisting essentially of copper-metal powder and alumina is prepared by blending 80 grams of minus 100 mesh, U.S. Sieve Series, copper-metal powder, 20 grams of minus 100 mesh alumina, and 5 grams of kaolin with a quantity of water sufficient that the slurry has a consistency suitable for application by brushing techniques. A thin layer of the resulting slurry is then brushed onto portions of a ceramic insulator, as indicated at 59 in FIG. 4. A suitable ceramic insulator can be produced by firing a uniform blend consisting essentially of about 92 parts of alumina, 1.5 parts of whiting, 2.0 parts of talc and 1.5 parts of bentonite, plus incidental impurities, the upper portion thereof having the shape of the insulator 17 (FIG. 1), while the lower portion has the shape of the insulator 58 (FIG. 4). The slip, so coated on the insulator, is then fired to about 2350° F. (Orton Cone 10), to produce an electrically semi-conducting engobe coating on the alumina insulator. The coated insulator is then assembled into an igniter having a nose portion as shown in FIG. 4, and otherwise identical with the igniter of FIG. 1. Such igniter is advantageous in certain respects, by comparison with the igniter of FIG. 1, because of the thinness of the electrically semi-conducting engobe coating. Electrical discharge through the insulator 58 is impossible, and the electric discharge is, therefore, concentrated at or near the surface to the virtual exclusion of discharge through the interior, so that a "hotter" or higher energy discharge can be obtained from a given applied voltage. Ordinarily, it is feasible to use the procedure described in this paragraph to produce a coating ranging in thickness from about 0.0005 to about 0.001". Variations in coating thickness are achieved by varying the water content of the slip, more water being used to produce a thin coating, and less water being used to produce a thicker coating. Coating thickness is not critical, but should be such that a desired electrical resistance is achieved with the particular coating employed. Where a particular coating procedure gives a higher electrical resistance than is desired, a second layer of the coating slip can be applied over the previously fired coating to produce, after re-firing, a thicker coating of somewhat lower resistance. Under most circumstances, when the coating technique is employed, it is preferred that the coating thickness range from about 0.0005" to about 0.005".

A further important phenomenon has been discovered when an electrically semi-conducting coating according to the invention is produced in the form of an engobe coating as discussed in the preceding paragraph. The phenomenon can be illustrated by reference to a specific procedure that has been carried out, and involving the application to the alumina insulator described in the preceding paragraph of a coating slip which is similar to that which is there described, assembly of the electrode 19 shown in FIGS. 1 and 4 of the drawings with the coated insulator, and with a part of the flange 24 in contact with the unfired slip, and then firing of the resulting assembly, as described above. It was found that the portion of the engobe coating 59 between the flange 24 of the electrode 19 and the insulator 58, when the coating was produced from 95 parts of copper-metal powder, 5 parts of kaolin, and sufficient water to give a working consistency, was tightly adhered to both, so that excellent electrical contact was provided between the flange 24 and the coating 59, with the result that a substantially lower applied voltage was required to cause a spark discharge in a plug assembled from such structure, by comparison with a plug assembled from a similar structure where the electrode 19 was inserted after firing to produce the coating 59. It has also been found that it is advantageous to fire the coating 59 while in contact with the ground electrode 20, because a similar mechanical and electrical bonding is effected between the coating and the electrode. A similar result can be achieved using the slurry described in the preceding paragraph, or other slurries which, after firing, produce electrically semi-conducting bodies as claimed herein.

A phenomenon similar to that discussed in the preceding paragraph has also been observed when either silver or gold particles are positioned between a ceramic insulator and a metal surface, and the resulting assembly is fired to a temperature above the melting point of the silver or gold, as the case may be. After such firing, the metal surface and the ceramic insulator are both tightly adhered to the silver or gold particles. This phenomenon is particularly important, at least in the igniter art, however, as a means for providing good electrical contact between an electrode part and a semi-conducting coating. Since engobe coatings containing either silver or gold are considerably more expensive than similar coatings produced from copper-containing compositions, but not significantly superior, the phenomenon has particular importance in the discussed application, when it occurs with copper-metal particles.

It will be apparent that various changes and modifications can be made from the specific features disclosed in the examples and discussed in the specification without departing from the spirit of the appended claims. In its essential details, the instant invention contemplates an electrically semi-conducting vitreous ceramic body produced by firing, in an oxidizing atmosphere, to a temperature from about 2350° F. to about 2705° F., and for a time corresponding approximately to Orton Cone 10 to Cone 18, an admixture consisting essentially of from about 5 percent to about 80 percent of copper-metal powder and from about 95 percent to about 20 percent of alumina.

This is a continuation-in-part of application Serial No. 386,189, filed October 15, 1953, entitled "Electrically Semi-Conducting Ceramic Body."

What I claim is:

1. An electrically semi-conducting vitreous ceramic body produced by firing in an oxidizing atmosphere to a temperature from about 2350° F. to about 2705° F., and for a time corresponding approximately to Cone 10 to Cone 18, an admixture consisting essentially of from about 5 percent to about 80 percent of copper-metal powder and from about 95 percent to about 20 percent of alumina.

2. An electrically semi-conducting vitreous ceramic body produced by firing in an oxidizing atmosphere to a temperature from about 2350° F., to about 2705° F., and for a time corresponding approximately to Cone 10 to Cone 18, an admixture consisting essentially of from about 20 percent to about 50 percent of copper-metal powder and from about 80 percent to about 50 percent of alumina.

3. An electrically semi-conducting vitreous ceramic body produced by firing in an oxiding atmosphere to a temperature from about 2350° F. to about 2705° F., and for a time corresponding approximately to Cone 10 to Cone 18, an admixture consisting essentially of from about 35 percent to about 45 percent of copper-metal powder and from 65 percent to about 55 percent of alumina.

4. A spark plug comprising a shell, at least two spaced metal electrodes carried by said shell, one of said electrodes being in contact with said shell, another of said electrodes being supported in the interior of said shell, and an electrically semi-conducting ceramic body as claimed in claim 1 between said electrodes in contact therewith for mechanically and electrically connecting said electrodes.

5. A spark plug comprising a shell, at least two spaced metal electrodes carried by said shell, one of said electrodes being in contact with said shell, another of said electrodes being supported in the interior of said shell, and an electrically semi-conducting ceramic body as claimed in claim 3 between said electrodes in contact therewith for mechanically and electrically connecting said electrodes.

6. A spark plug comprising a shell, at least two spaced metal electrodes carried by said shell, an insulator between said electrodes, and a coating of an electrically semi-conducting ceramic body as claimed in claim 1, adhered to said insulator for mechanically and electrically connecting said electrodes.

7. A spark plug comprising a shell, at least two spaced metal electrodes carried by said shell, an insulator between said electrodes, and a coating of an electrically semi-conducting ceramic body as claimed in claim 3, adhered to said insulator for mechanically and electrically connecting said electrodes.

8. In a spark plug assembly comprising a metal shell, an electrically insulating ceramic core seated in the shell, a ground electrode attached to the metal shell, and a central electrode having a firing tip appropriately positioned relative to the ground electrode to provide a spark gap, the improvement comprising a separately fired central electrode firing tip composed of an electrically semi-conducting ceramic material as claimed in claim 1.

References Cited in the file of this patent
UNITED STATES PATENTS 2,684,665    Tognola _____ July 27, 1954

UNITED STATES PATENT OFFICE

CERTIFICATE OF CORRECTION

Patent No. 3,037,140             May 29, 1962

Harry G. Schurecht

It is hereby certified that error appears in the above numbered patent requiring correction and that the said Letters Patent should read as corrected below.

Column 6, line 11, for "FIG. 1" read -- FIG. 2 --.

Signed and sealed this 12th day of February 1963.

(SEAL)
Attest:

ERNEST W. SWIDER
Attesting Officer

DAVID L. LADD
Commissioner of Patents